Patented Jan. 9, 1923.

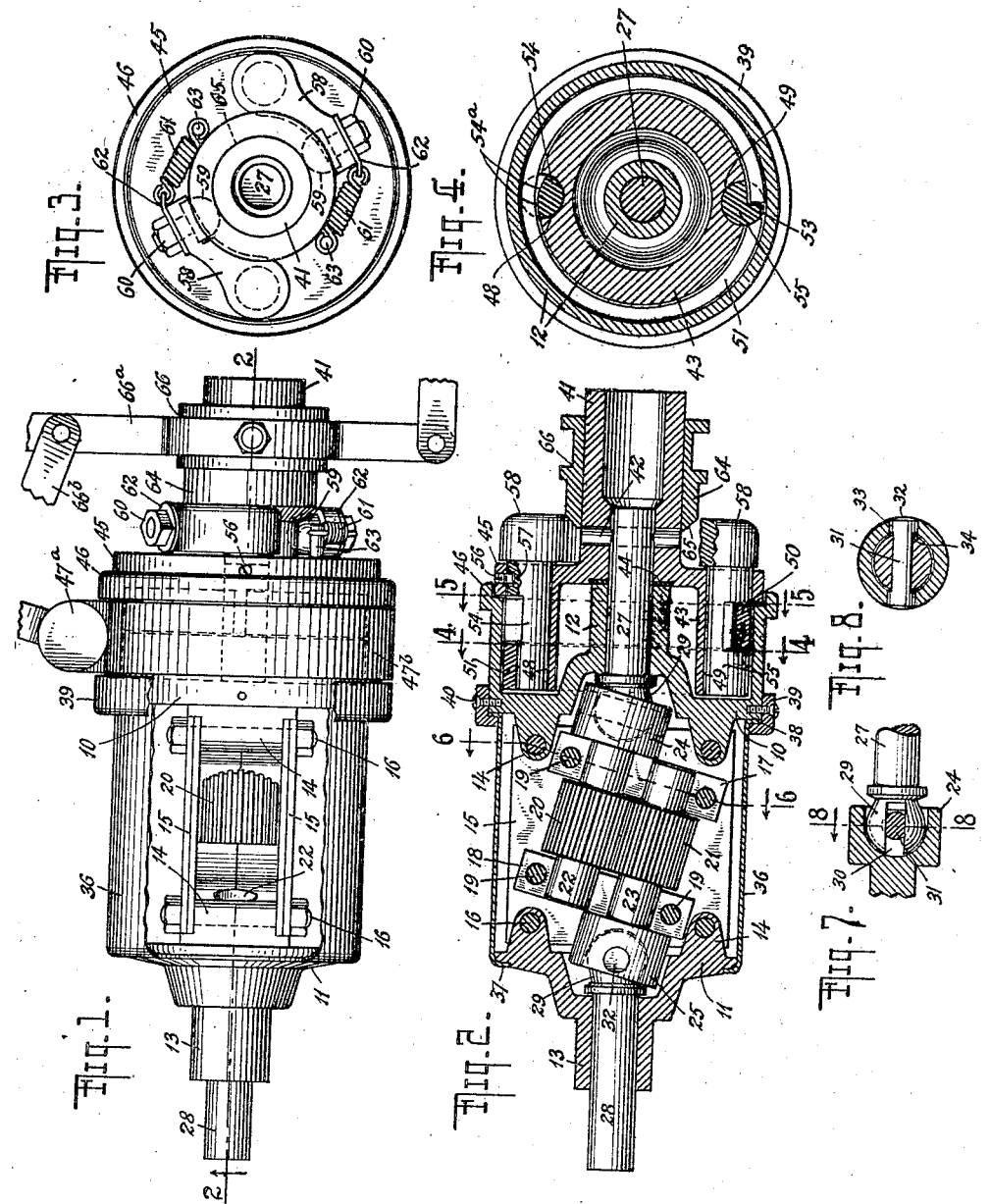

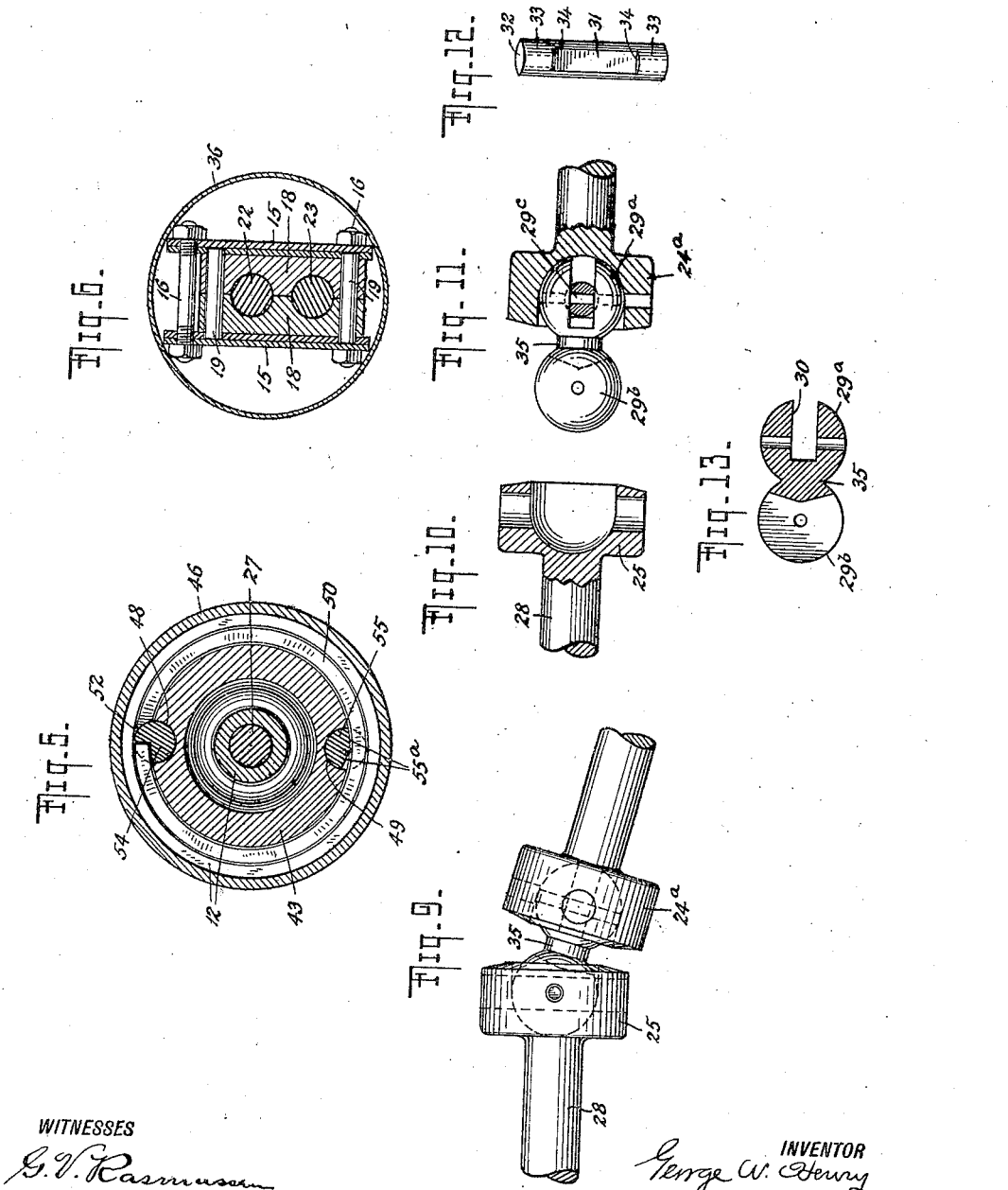

1,441,682

UNITED STATES PATENT OFFICE.

GEORGE W. HENRY, OF RIDGEWOOD HEIGHTS, NEW YORK.

REVERSING GEAR.

Application filed May 21, 1919. Serial No. 298,662.

*To all whom it may concern:*

Be it known that I, GEORGE W. HENRY, a citizen of the United States, and resident of Ridgewood Heights, borough and county of Queens, State of New York, have invented certain new and useful Improvements in Reversing Gears, of which the following is a specification.

My invention relates to reversing gears and has for its object to provide a simple and efficient construction, including a simplified universal joint and an efficient clutch arrangement. Other more specific objects of my invention will appear from the description hereinafter and the features of novelty will be pointed out in the appended claims.

In the accompanying drawings, which for illustrative and descriptive purposes show an example of my invention, Fig. 1 is a plan view partly in section; Fig. 2 is a longitudinal section on the line 2—2 of Fig. 1; Fig. 3 is an end view; Fig. 4 is a cross-section on the line 4—4 of Fig. 2; Fig. 5 is a similar view on the line 5—5 of Fig. 2; Fig. 6 is another similar view on the line 6—6 of Fig. 2; and Figs. 7 to 13 inclusive are detail views illustrating the universal joint.

As shown in the illustrated example my invention comprises end members 10 and 11 spaced apart in axial alignment and provided with axially registering bearings 12 and 13 which project in opposite directions respectively from said members 10 and 11 as shown in Fig. 2. On their opposed inner faces the members 10 and 11 are provided with shouldered lugs 14 to which suitably shaped plates 15 are connected for instance by means of bolts 16, said plates serving to rigidly connect said members 10 and 11 together and to maintain them in the intended spaced relation as shown in Fig. 1. Bearing blocks 17 and 18 are located between the plates 15 and are secured thereto in any convenient manner as by means of dowel pins 19; gears 20 and 21 are located between the blocks 17 and 18 in mesh with each other and are formed with trunnions 22 and 23 which, in effect, constitute auxiliary shafts and are journalled in the blocks 17 and 18 as shown in Fig. 2. In addition universal sockets 24 and 25 are carried respectively by the trunnions 22 and 23, the socket 24 being located adjacent to the outer face of the bearing block 17 and the socket 25 being contiguous to the outer face of the bearing block 18. As shown in Fig. 2 the bearing blocks 17 and 18 are mounted between the plates 15 so as to incline the axes of the gears 20 and 21 and their trunnions 22 and 23 with respect to the common axis of the bearings 12 and 13, the angles of inclination being such as to bring the centre of the universal sockets 24 and 25 into registry with said common axis. A driving shaft 27 is journalled in the bearing 12 and is connected with a source of power, such as an engine or motor in any conventional and well known way, for instance as will be hereinafter described; a driven shaft 28 is rotatably mounted in the bearing 13 and is coupled to the element to be driven which for the purposes of description and illustration may be designated as a propeller. Each of the shafts 27 and 28 carries a head 29 formed with an open recess 30 extending diametrically therethrough as shown in Figs. 7 and 8 and fitting over the intermediate flattened portion 31 of a pin 32 which has its relatively enlarged and circular ends 33 located in diametrically opposite openings in the sockets 24 and 25. With this arrangement the shoulders 34 formed on the pins 32 engage the peripheries of the heads 29 and are thereby held in place in the sockets 24 and 25; at the same time the pins 32 in turn couple the heads 29 to the sockets 24 and 25 to complete the universal joints. If for any reason it should be deemed necessary or advisable, a member 35 having duplicate heads $29^a$ and $29^b$ as shown in Figs. 9, 11 and 13 and corresponding to the heads 29 may be used to connect either or both of the shafts 27 and 28 with the respective gears 20 and 21; in such case the shaft carries a socket $24^a$ similar to the sockets 24 and 25 into which one of the heads $29^a$ or $29^b$ is fitted, the other head being located within the socket 24 or 25 as above described. It will be understood, when the member 35 is used, that the construction, operation and connection of the duplicate head with the duplicate socket is the same as set forth above. In some cases it may be deemed advisable or necessary to provide a pin $29^c$ which extends transversely through the heads 29, $29^a$ or $29^b$ and through the pins 32 and whereby the latter and the heads are positively secured together against separation in an axial direction.

In the preferred construction a shell 36 extends over the end member 11 and plates 15 to form a housing for the gearing and arranged to contain grease or other lubricant whereby the parts are properly lubricated in the well-known way. The shell 36 may be secured in position in any suitable manner and preferably so as to be readily detachable; for instance, said shell may be provided with an inwardly extending annular flange 37 arranged to engage the end member 11 and an outwardly projecting annular flange 38 engaging the end member 10 and held in place by a flanged ring 39 which is itself secured to the end member 10, for instance, by screws 40 as shown in Fig. 2.

In the illustrated example a coupling 41 is secured upon the driving shaft 27, for instance by means of a dowel pin 42 and serves as the means whereby said shaft is connected with a source of power. The coupling 41, as shown, is provided with a preferably integral drum 43 which extends toward the end member 10 and surrounds the bearing 12 at a distance as shown in Fig. 2; if desired an end thrust washer 44 of fibre or other suitable substance may be located between the end of the bearing 12 and the coupling 41. The drum 43 is formed with an annular flange 45 which is located in the recessed end 46 of an annular sleeve 47 projecting from and preferably comprising an integral part of the end member 10 as shown in Fig. 2; the drum 43 is further provided with a pair of outwardly open recesses 48 and 49 preferably located at diametrically opposite points for the purpose to be more fully described hereinafter. A pair of split rings or clutch bands 50 and 51 surround the drum 43 and are located side by side between the flange 45 and the end member 10, it being understood that said rings are inwardly resilient and normally clamped about said housing out of contact with the sleeve 47 and having no engagement with the end member 10. The bands 50 and 51 are so located with respect to each other as to bring the splits thereof out of registry with each other and into registry respectively with the recesses 48 and 49. As shown in Figs. 4 and 5 the ends of the rings 50 and 51 are in co-operative relation to cams 52 and 53 formed respectively on members 54 and 55 rotatably mounted in the recesses 48 and 49, said cams 52 and 53 being formed so as to be capable of expanding said rings and of permitting them to resiliently contract back to normal positions. It will be understood that the member 54 is cut out or shaped so as not to interfere with the band 51 and that the member 55 is constructed so as not to interfere with the band 50; furthermore the members 54 and 55 are formed with inclined surfaces 54$^a$ and 55$^a$ respectively as shown in Figs. 4 and 5, said surfaces being located in registry with the bands 50 and 51 and serving to permit the necessary degrees of rotation of said members 54 and 55 in the use of the clutch device. As shown in the illustrated example, the member 54 is maintained against axial movement in the recess 48 by means of a screw 56 which passes through the flange 45 into a circumferentially extending recess 57 formed in the member 54; the member 55 is held against axial displacement in the recess 49 by the band 50 as shown in Fig. 2.

At their outer ends the members 50 and 51 carry arms 58 which lie along the outer surface of the flange 45 and are provided at their free ends with hemispherical or otherwise rounded studs 59 secured in place for instance by nuts 60 and normally bearing upon the periphery of the coupling 41. Coil springs 61 having one end secured to plates 62 clamped upon the arms 58 by the nuts 60 and the other end fastened to suitable studs 63 projecting outwardly from the flange 45, serve to maintain said studs 59 in engagement with said coupling 41 and to return them thereto. A collar 64 is slidably mounted upon the coupling 41 and is provided at its inner end with a taper or bevel 65 located in operative relation to the studs 59 as shown in Fig. 2; the collar 64 may be provided with an annular groove 66 for the accommodation of the forked end of an operating lever 66$^a$ of customary construction whereby said collar may be moved lengthwise of said coupling 41 in an axial direction in the well-known way. It will, of course, be understood that any other convenient arrangement may be utilized for shifting said collar relatively to the coupling 41. The arrangement further includes the clamping device 47$^a$ which may be of any suitable type, for instance, as shown in United States Patent No. 714,197 of November 25, 1902, and which includes a collar 47$^b$ surrounding the sleeve 47. The clamping device is operatively connected with the lever 66$^a$ by a link 66$^b$ in the usual way.

In the normal condition of the mechanism when power is applied to rotate the driving shaft 27, the universal joint 24—29 will cause the gear 20 to be rotated and in turn to rotate the gear 21 in the opposite direction; the rotary motion of the latter is transmitted to the driven shaft 28 through the medium of the universal joint 25—29, with the result that the direction of rotation of the driven shaft 28 is opposite to that of the driving shaft 27. The latter, during rotation, carries with it the coupling 41, drum 43, arms 58 and their connected parts and the bands 50 and 51 which revolve in close proximity to but out of contact with the inner surface of the sleeve 47 which, under these conditions, remains stationary, and is positively held against rotation by the clamping device 47ª—47ᵇ which is properly actuated coincidentally with the operation of the lever 66ª in the usual way. The rotation of the parts described is also relatively to the collar 64 and is guided and steadied by means of the flange 45 in co-operation with the recessed end 46 of the sleeve 47.

If the collar 64 is now moved lengthwise of the coupling 41 toward the flange 45, the bevelled end 65 thereof will force itself beneath the studs 59 and will cause the same to ride up on the collar 64. As the studs 59 are thus moved outwardly the arms 58 will be similarly actuated against the tension of the springs 61 and will cause a rotation of the members 54 and 55 about their axes in the recesses 48 and 49, as is apparent from the illustrations in Figs. 4 and 5; these movements of said members 54 and 55 are in directions to cause the cams 52 and 53 to exert a force on the ends of the bands 50 and 51 whereby said bands are spread outwardly and thus brought into engagement with the inner surface of the sleeve 47. In this manner the latter and with it the gears 20 and 21 and driven shaft 28, through the medium of the plates 15, are coupled to the driving shaft so as to partake of the rotative motions thereof; the result of this is that the driven shaft 28 is now rotated in the same direction as the driving shaft 27 or in other words in a direction reverse to that in which it was driven prior to the described actuation of the collar 64. It will be understood that the clamping device 47ª—47ᵇ is released, coincidentally with the operation of the lever 66ª, to permit the described rotation of the sleeve 47 and its connected parts. An operation of the collar 64 in the reverse direction causes the parts to resume their normal positions in which the driven shaft 28 revolves in the opposite direction to that of the driving shaft 27.

My improved reversing gear is very simple in construction and efficient in operation and includes the described improved universal joints whereby power is readily and easily transmitted from one shaft to the other with a minimum of friction and with a maximum of efficiency. While my improved universal joint is particularly adapted for use in my improved reversing gear it is obvious that said joint may be used with equally good results in other ways.

The improved clutch included in my gear whereby the two shafts are directly coupled together is of maximum efficiency and simplicity; by locating the bands 50 and 51 with the splits at diametrically opposite points the spread of the two bands is such as to preserve the true circular formation of the actual surface which engages the sleeve 47 to couple the parts together. It will, of course, be understod that if desired or found advisable the bands may be arranged otherwise than as shown.

Various changes in the specific form shown and described may be made within the scope of the claims without departing from the spirit of my invention.

I claim:

1. A reversing gear comprising opposed end members spaced from each other in axial alignment, a driving shaft journalled on one of said members, a driven shaft journalled on the other member, a pair of parallel, auxiliary shafts located between said driving and driven shafts and inclined relatively thereto, gears carried by said auxiliary shafts in mesh with each other, bearing blocks for said auxiliary shafts carried by said members, universal joints whereby said auxiliary shafts are connected respectively with said driving and driven shafts to normally rotate the latter in opposite directions, a sleeve carried by one of said end members and clutch mechanism carried by the driving shaft and co-operating with said sleeve to couple said shafts together to rotate in the same direction.

2. A reversing gear comprising opposed end members spaced from each other in axial alignment, a main driving shaft journalled on one of said members, a main driven shaft journalled on the other member in axial alignment with said driving shaft, spaced, parallel plates extending between and connected with said end members, bearing blocks mounted between said plates, parallel, auxiliary shafts journalled in said bearing blocks, a pair of gears carried by said auxiliary shafts in mesh with each other, the axes of said bearing blocks, auxiliary shafts and gears being inclined relatively to the common axis of said driving and driven shafts, universal joints whereby each of said auxiliary shafts is connected with one of said main shafts to normally rotate the latter in opposite directions, a sleeve carried by one of said end members, a drum carried by said driving shaft and a drum carried by said driving shaft and inwardly extending within said sleeve, an inwardly resilient clutch-band surrounding said drum and means for expanding said band into engagement with said sleeve whereby said two main shafts are coupled together to rotate in the same direction.

In testimony whereof I have hereunto set my hand.

GEORGE W. HENRY.